March 9, 1965   M. S. TAFFET   3,172,978
COMBINATION TIMER AND THERMOSTAT SWITCH
Filed Aug. 10, 1962   2 Sheets-Sheet 1
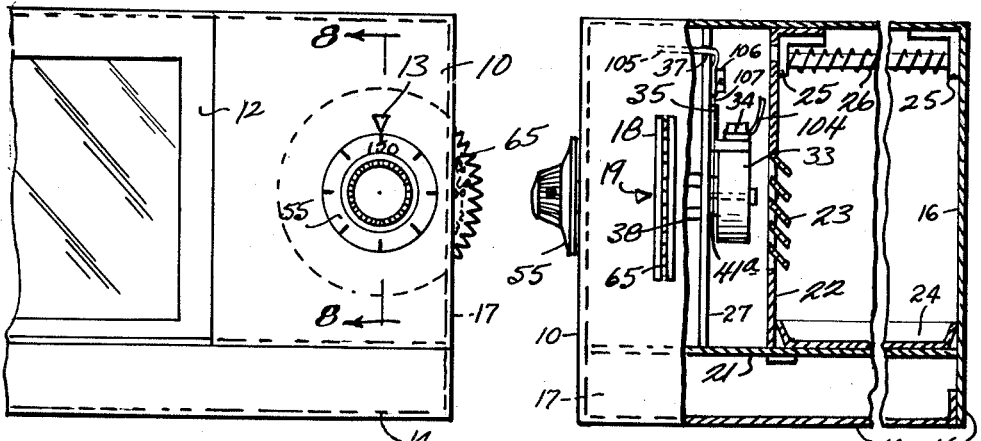
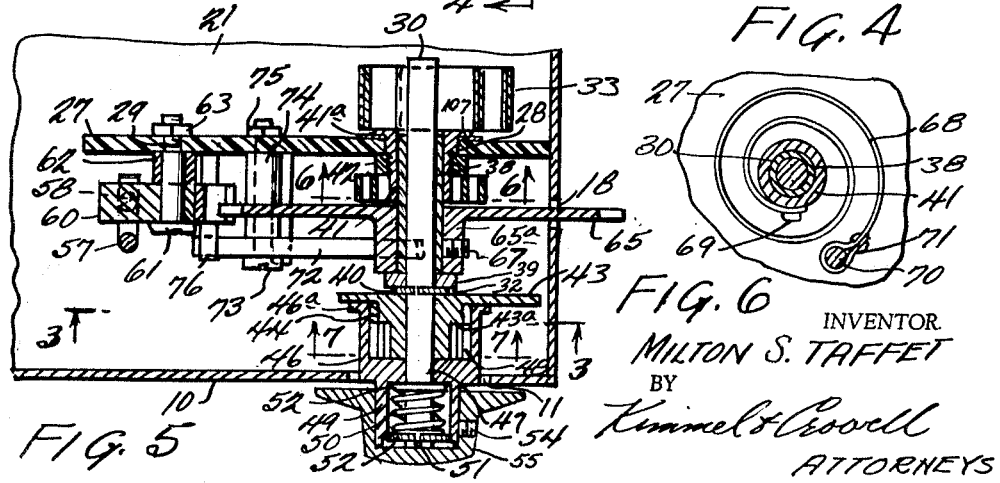
INVENTOR.
MILTON S. TAFFET
BY
Kimmel & Crowell
ATTORNEYS March 9, 1965  M. S. TAFFET  3,172,978
COMBINATION TIMER AND THERMOSTAT SWITCH
Filed Aug. 10, 1962  2 Sheets-Sheet 2
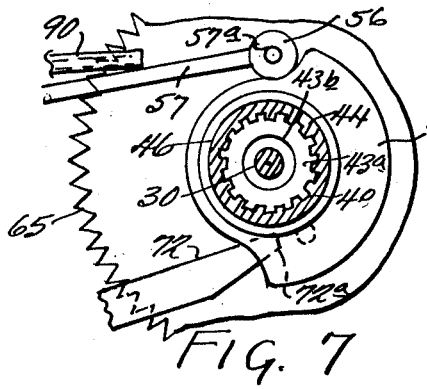
FIG. 7
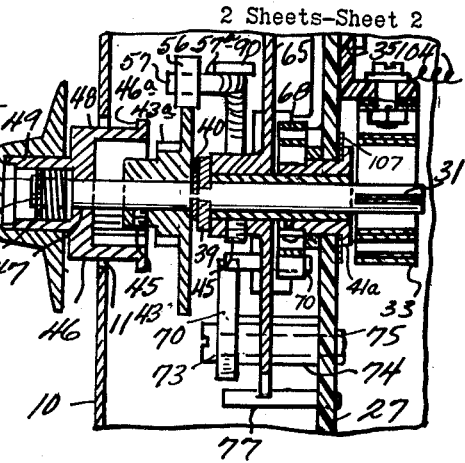
FIG. 8
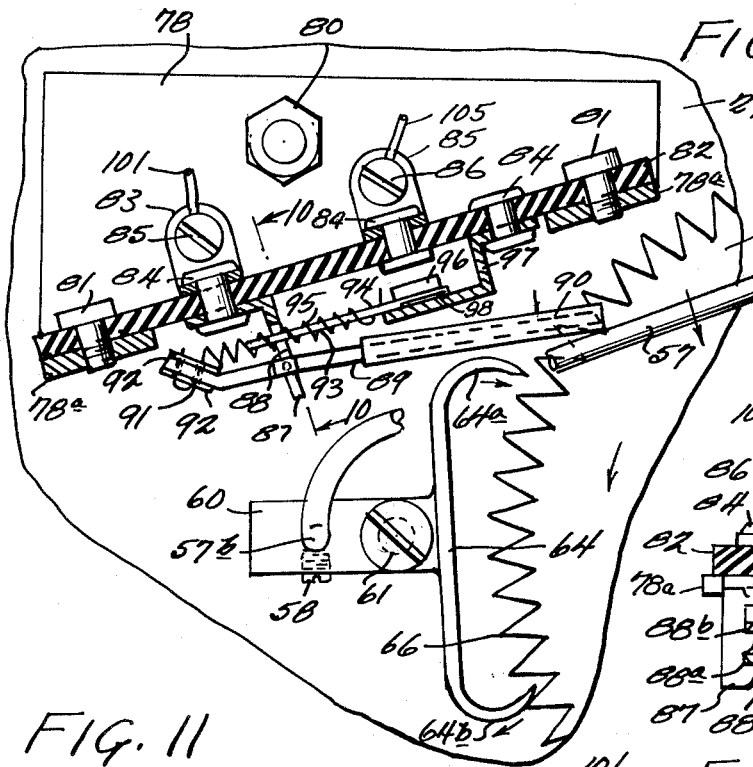
FIG. 9
FIG. 11
FIG. 10
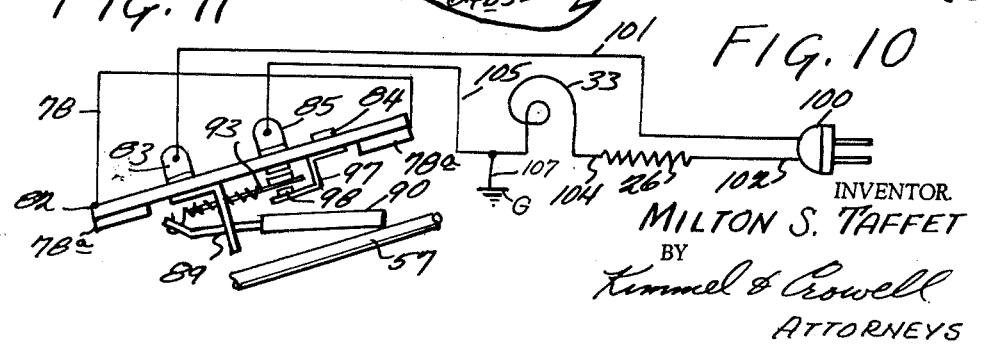
INVENTOR.
MILTON S. TAFFET
BY
Kimmel & Crowell
ATTORNEYS United States Patent Office 3,172,978
Patented Mar. 9, 1965

3,172,978
COMBINATION TIMER AND THERMOSTAT SWITCH
Milton S. Taffet, 31 Elliott Road, Great Neck, N.Y.
Filed Aug. 10, 1962, Ser. No. 216,101
13 Claims. (Cl. 200—136)

This invention relates to a combination timer and thermostatically operated switch for controlling any electrical appliance or instrumentality which is operated intermittently and which is responsive to temperatures higher or lower than the ambient temperature. Among such instumentalities are air conditioners, room heaters, oil burning furnaces, etc.

The object of the present invention is to provide a timer and a thermostatically operated switch which can jointly control an electrical appliance or instumentality.

Another object of the present invention is to provide a combination timer and a thermostatically operated switch which is simple in construction and can be operated with ease.

A further object of the present invention is to provide a combination timer and thermostatically operated switch which is adjustable as to operation over wide ranges of both time and temperature.

An additional object of the present invention is to provide a combination timer and thermostatically operated switch in which the timer and the thermostat are mechanically interconnected.

A still another object of the present invention is to provide a combination timer and thermostatically operated switch in which the timer and the thermostat are interconnected but each is independently settable over a predetermined operating range.

Still other objects, advantages and improvements will become apparent from the following specification, taken in connection with the accompanying drawings, in which;

FIGURE 1 is a front elevational view of an air conditioner cabinet in which the combination timer and thermostatically operated switch according to the present invention is used showing the temperature and time controls;

FIGURE 2 is an end elevational view of the air conditioner cabinet shown in FIGURE 1 with part of the end wall broken away;

FIGURE 3 is a transverse vertical sectional view through the cabinet taken on the section line 3—3 of FIGURE 5 and looking in the direction of the arrows;

FIGURE 4 is a transverse vertical sectional view, taken on the section line 4—4 of FIGURE 3 and looking in the direction of the arrows;

FIGURE 5 is a horizontal sectional view taken on the section line 5—5 of FIGURE 3 and looking in the direction of the arrows;

FIGURE 6 is a vertical detail sectional view, taken on the section line 6—6 of FIGURE 4 and looking in the direction of the arrows, showing the coiled biasing spring;

FIGURE 7 is a transverse vertical sectional view, taken on the section line 7—7 of FIGURE 8 and looking in the direction of the arrows;

FIGURE 8 is a longitudinal vertical sectional view, taken on the section line 8—8 of FIGURE 7 and looking in the direction of the arrows;

FIGURE 9 is a transverse vertical sectional view, similar to FIGURES 3 and 7 but on an enlarged scale;

FIGURE 10 is a detail sectional view, taken on the section line 10—10 of FIGURE 9 and looking in the direction of the arrows, showing the details of the snap action switch; and, FIGURE 11 is a circuit diagram.

Referring now to the drawings in detail and to FIGURES 1 and 2 in particular, the invention is here shown as incorporated in the cabinet of an air conditioner of the well known type adapted to fit into a window frame. The cabinet or other such housing means is comprised by a front wall 10, a bottom 14, top 15, back wall 16, and an end wall 17 and a similar opposed end wall (not shown). The housing means includes a horizontally positioned partition 21, which forms the top of a lower compartment and above this partition there is a vertically positioned partition 22, parallel to the front wall 10 and the rear wall 16, which divides the interior of the housing mens into upper front and rear compartments. This later partition 22 has suitable louvers 23 therein to provide for limited air passage between the front and rear upper compartments. A drip pan 24 rests on the bottom of the upper rear compartment. At the top of this latter compartment an electrical resistance heating coil 26, to be later described, is mounted by angle brackets 25—25. Over the usual air inlet opening in the front wall 10 there is mounted a removable window 12. This window will be in place during seasons of the year when the air conditioner is not in use.

The components of the timer and the thermostatic switch according to the present invention are mounted on a plate 27 of insulating material forming part of the housing means, which plate is positioned intermediate the front wall 10 and the vertical partition 22 and parallel to same. A shaft 30 is rotatably mounted in the plate 27 and the front wall 10. On the rear face of the plate 27 there is mounted a coiled bi-metallic thermostat 33. At its outer end this thermostat is secured by a machine screw 34 to one leg of an angle bracket 35 of insulating material, the other leg of the bracket being secured by machine screws 36 to the plate 27. The machine screw 34 also forms a terminal for an electrical conductor 104 from the electrical resistance coil 26, in the circuit to be later described. At its inner end the coiled thermostat is received in a diametrically positioned slot 31 in the shaft 30. Expansion and unwinding of the coiled bi-metallic thermostat 33 is determined to a considerable extent by air heated by the electrical resistance coil 26 in the rear compartment, which air passes through the louvers 23 in the partition 22 and around the thermostat.

A sleeve 38 freely surrounds the shaft 30. At its outer end this sleeve abuts a washer 39, which is in turn held against a snap ring 40, the latter being received in a circumferential groove 32 in the shaft 30. A bushing 41 has a flange 41a at one end and is threaded at the midsection. This bushing is received in a hole 28 in the mounting plate 27 and is held in place by a nut 42 on its threaded mid-section. The sleeve 38 extends through the bushing 41 which latter forms a bearing for the sleeve.

A disc cam 43 has an intermediate hub 43a, with splines 44 thereon, and outer hub 43b and an axial bore through the cam disc and the hubs. The shaft 30 is received in the axial bore through the disc cam and the hubs and the cam is held in place on the shaft by a radially positioned set screw 45, which extends through a suitable screw threaded hole in the outer hub 43b. On its inner face the cam disc abuts the snap ring 40. Looking from the front of the housing means as shown in FIGURE 3 the cam 43 is rotated in a counter-clockwise direction as the coiled bi-metallic thermostat 33 expands and unwinds, due to a rise in temperature, and in the clockwise direction as the thermostat contracts and winds up, due to a fall in temperature. The leading end of the lobe of the cam from the intermediate hub 43a to its periphery is formed partly on a concavely and partly on a convexly curved surface 43c, this being the rise of the cam and the surface over which a follower roller 56, to be next described, travels. The trailing end of the lobe between the circumference and the intermediate hub 43a is a curved surface 43d of any desired shape.

A coupling or clutch means includes a clutch member 46 of generally cylindrical shape which is slidably and rotatably received in a circular hole 11 in the front wall 10 of the cabinet. This clutch member has an axial bore 47 therethrough in which the shaft 30 is slidably received. On its inner face the clutch member has a flange 46a, which is adapted to abut the cam disc 43 upon inward movement of the clutch member. From the inner face a counter bore extends axially and this counter bore is formed with lengthwise extending splines 48, which are adapted to engage the splines 44 on the intermediate hub 43a of the cam disc also upon inward movement of the clutch member. On its outer face the clutch member 46 has an integral hollow boss 49. Within this boss a coiled compression spring 50 surrounds the shaft 30, this spring abutting at its inner end a washer 52 at the bottom of the bore in the boss 49 in the clutch member 46, and at its outer end a washer 52 on the outer end of the shaft 30, which latter is held in place by a diametrically positioned pin 51. This spring 50 normally biases the clutch member 46 into engagement with the cam disc 43. On the hollow boss 49, there is mounted a temperature controlling knob 55, which latter is held in place by a radially positioned set screw 54. This knob 55 is graduated in a scale of degrees Fahrenheit, which scale is placed around its circumference. A cooperating index mark 13 is placed on the front wall of the cabinet. It will be apparent that the knob 55 and the clutch member 46 may be pulled outward, against the action of the coiled compression spring 50, to disengage the clutch means by disengaging the splines 48 in the clutch member 46 from the splines 44 on the intermediate hub 43 of the cam disc, as shown in FIGURE 8, the knob and clutch member partially rotated and then released, and the splines 48 in the clutch member will again engage the splines 44 on the intermediate hub on the new relative angular position.

A timing disc 65 has a hub 65a with an axial bore therethrough and is received on the sleeve 38 and held in place by a set screw 67, which extends through a radially positioned hole in the hub 65a. This disc has a continuous row of notches 66 around its circumference and adjacent this row of notches there is a scale which is graduated in minutes. The pitch of the notches is correlated with the spacings of the marks on the scale so that each notch corresponds to one minute. A sector of the timing disc extends outwardly through an elongated slot 18 in the end wall 17 of the cabinet for manual operation. At one side of the slot 18, there is placed a cooperating index mark 19 in the end wall. This timing disc is biased to rotation in the counter-clockwise direction as seen from the front of the housing means in FIGURE 3 and the front of the housing means in FIGURE 6 by a coiled tension spring 68. The inner end of this spring is secured by a set screw 69 to the bushing 41 which defines a fixed support and the outer end is formed as a loop which is held closed by a rivet 71, and which loop surrounds a pin 70 extending through the timing disc 65.

A stop is provided for determining the limit position of the timing disc 65. This stop is comprised by a lever 72 having a nose 72a at its forward end. The lever is pivotally mounted on the plate 27 by a machine bolt 73, a spacer sleve 74 being placed intermediate the lever and the plate and a nut 75 on the outer end of the bolt. Pins 76 and 77 are secured in the plate 27 on the opposite sides of the tail end of the lever 72 to limit swinging movement of the latter in either direction. As stated above, the pin 70 extends through the timing disc 65. In counter-clockwise rotation of the timing disc 65, as shown in FIGURES 3 and 9, the pin 70 rises over the nose 72a of the lever. In clockwise rotation of the timing disc, however, the latter will be stopped with the pin 70 in the vertical position, approximately as shown in FIGURE 3, and abutting the nose 72a of the lever. The lever 72 then operates as a limit stop to prevent over travel of the timing disc 65 in the clockwise direction of rotation of the latter. It may however be utilized on a brake by arranging same to have frictional contact with the timing disc.

A follower roller 56 is mounted on one right angle end 57a of a follower arm 57 and rides on the cam 43. The other right angles end 57b of this arm is received in a hole in the outer end of a short lever 60 and held in place by a set screw 58. This lever 60 is pivotally mounted on a screw 61, which extends through a hole 29 in the plate 27 and has a nut 63 on its outer end, a spacer sleeve 62 being positioned between the lever 60 and the plate 27. At its inner end the lever 60 carries an escapement fork 64, which has upper and lower prongs 64a and 64b, respectively, for selective engagement with the notches 66 in the timing disc 65. The escapement fork 64 controls rotation of the timing disc 65 in the clockwise direction.

The switch is partially illustrated in FIGURES 7 and 10 and fully illustrated in FIGURE 9. This switch is of the snap action type. Its lever moves from the open to the closed position in response to pivotal movement of the follower arm 57 with a snap action, thereby eliminating poor contact closure and the resultant sparking. The switch is mounted on a bracket 78, which is secured to the plate 27 by a bolt 79 having a nut 80 thereon. At its bottom and adjacent its ends, the bracket 78 is formed with right angle arms 78a—78a. A strip 82 of insulating material is secured to the arms 78a—78a by screws 81. On the upper face of the strip 82 there are mounted right angle terminals 83 and 85 by rivets 84. The rivet 84, which mounts the terminal 83 on the strip 82, is itself the fixed contact; the terminal 85 is the connection for a movable contact 96. The rivet 84 mounting this terminal being the cooperating fixed contact. A conductor 101 is connected to the terminal 83 and a conductor 105 is connected to the terminal 85 by screws 86, these conductors being further described in connection with the circuit diagram of FIGURE 11. The rivet 84, which mounts the terminal 83 on the upper face of the strip 82, also extends below the strip through a suitable hole in one leg of an L-shaped bracket 87, which has an elongated slot 88 in its other leg. A switch lever 89 is pivotally mounted on lugs 88a—88a at the opposite sides of the slot 88 in the bracket 87. The inner end of the switch lever 89 is encased by a sleeve 90 of insulating material, which rests on the cam follower arm 57. Adjacent its outer end the switch lever is bent upwardly and inwardly and has on its top and bottom faces plates 92—92, which are secured thereto in any movable manner (not shown). Parallel holes 91—91 are formed through the upwardly and inwardly bent end of the switch lever 89 and the plates 92—92. A switch blade 93 is also pivotally mounted on lugs 88b—88b on the opposite sides of the slot 88 in the L-shaped bracket 87. This switch blade has a hole 94 therein adjacent its mid-section, in which there is received one end of a coiled tension spring 95, the other end of this spring being looped through the parallel holes 91—91 in the outer end of the switch lever 89 and the plates 92—92 on the latter. This inner end of switch blade 93 carries the movable contact 96, which cooperates with the fixed contact 84, formed by the head of the rivet which secures the terminal 85 on the insulating strip 82. A third rivet 84 mounts a Z-shaped bracket 97 on the underside of the insulating strip 82, the free leg of this bracket underlying the switch blade 93 and carrying a fixed open circuit contact 98 on which the switch blade 93 rests, when the circuit, to be now described, is open.

The wiring diagram is shown in FIGURE 11. A plug 100 is adapted to be inserted in a socket of any suitable electrical power supply, such as a 110 volt, 60 cycle, A.C. line. One side of this plug is connected by a conductor 101 to the terminal 83 for the movable contact 96 of the switch; the other side of the plug is connected by a conductor 102 to the electrical resistance coil 26, which supplies heat for the bi-metallic thermostat 33. The other side of this resistance coil is connected by a conductor 104 to the terminal 34 at one end of the thermostat. The conductor 105 from the terminal 85 for the fixed contact of the switch extends through a hole 37 in the mounting plate 27 and is connected to a screw 106 on the other side of the mounting plate. A conducting strip 107 has a hole (not shown) at its upper end and is received under the head of the screw 106. This conducting strip extends downwardly along the mounting plate 27 and at its lower end is formed as a disc, which also has a hole (not shown) therein, the bushing 41 being received in this latter hole. Thus a circuit connection is completed from the conducting strip 107 to the other end of the thermostat 33 through the bushing 41, sleeve 38 and shaft 30. As these latter parts are grounded, a ground is shown schematically at G on the conductor 105 in the circuit diagram of FIGURE 11.

While the coiled bi-metallic thermostat 33 is shown connected in series circuit relationship, it need not be so. It may not be included in the circuit at all but merely secured on one end to the shaft 30 and at its other end to the bracket 35 and the resistance coil 26 mounted in close juxtaposition to same. In such case, the conductors 104 and 105 would be replaced by a single conductor.

In operation, the timing disc 65 is rotated in the counter-clockwise direction (FIGURES 3 and 9) through an angle wherein the number of the notches 66 passing the index mark 19 corresponds to the number of minutes for which it is desired that the connected electrical appliance or instrumentality shall operate. The teeth 66 on the disc pass beneath the upper prong 64a of the escapement fork 64 but the latter engages the teeth in such manner as to prevent any rotation of the timing disc in the clockwise direction until the upper prong is disengaged from the teeth by swinging movement of the cam follower arm 57 which now drops and allows the switch lever 89 to pivot in the clockwise direction. The dead center position of the coiled tension spring 95 with respect to the switch blade 93 is overcome and the spring swings the switch blade in the counter-clockwise direction with the movable contact 96 engaging the fixed contact 84, which is associated with the terminal 85. The closing of the switch completes the circuit through the electrical resistance coil 26 and the coiled bi-metallic thermostat 33. The coil 26 develops heat which, according to Joule's law, is directly proportioned to the square of the current value, ohmic resistance of the coil, and the time during which the current flows. The heat is radiated onto the thermostat 33.

The knob 55 controls the temperature range. This knob and the clutch member 46 are normally in their inward position, due to the action of the compression spring 50, with the internal splines 48 in the clutch member in engagement with the external splines 44 on the intermediate hub 43a on the cam 43. The knob may then be rotated in the clockwise direction (FIGURE 1) to wind up the coiled bi-metallic thermostat 33 and give the latter a greater range of movement during its expansion, for a given rise in temperature. Conversely, the knob 55 may be rotated in the counter-clockwise direction to farther unwind the thermostat and give the latter a lesser range of movement during the expansion for the same rise in temperature. As above stated the knob 55 and clutch member 46 may be pulled outward, against the force of the compression spring 50, and the splines 48 in the clutch member freed from the splines 44 on the intermediate hub 43a of the cam disc, the knob arm clutch member rotated relatively to the cam disc, and then released to allow the splines 48 in the clutch member to re-engage the splines 44 on the intermediate hub 43a of the cam disc in a different angular position. This brings a different section and range of the temperature scale on the knob 55 below the index mark 13 on the front wall 10 of the cabinet.

With the time and temperature settings made as above, the sequence of operations is as follows: The spiral bi-metallic thermostat 33 expands, due to the temperature rise from current flowing through the thermostat itself and to the radiation of heat from the electrical resistance coil 26. The expansion and consequent unwinding of the thermostat 33 rotates the shaft 30 and the cam disc 43 in the counter-clockwise direction, as viewed in FIGURES 3, 7 and 9. As above stated, the contacts 96 and 84 of the switch were closed upon rotation of the timing disc 65 to set the time desired. As cam 43 rotates in the clockwise direction due to the rise in temperature, again as viewed in FIGURES 3, 7 and 9, the follower roller 56 rises on the leading end 43c of the cam to a point e FIGURE 3 at approximately mid-height, raising the follower arm 57, swinging the lever 60 in the counter-clockwise direction and withdrawing the upper prong 64a of the escapement fork 64 from engagement with the aligned notch 66 in the timing disc 65. This allows the timing disc 65 to advance one step in the clockwise direction due to the action of the coiled tension spring 68. The advance is limited to one step by the engagement of the lower prong 64b of the escapement fork with an aligned notch 66 in timing disc. At the same time, the cam follower arm 57 allows the switch lever 89 to drop, that is, to partially rotate in the counter-clockwise direction, and the coiled tension spring 95 pulls the switch blade 93 to partially rotate in the counter-clockwise direction, thus aligning the latter two elements and separating the movable contact 96 from the fixed contact 84 of the switch and opening the circuit.

With the circuit open, the current ceases to flow, the coiled bi-metallic thermostat 33 is no longer heated by the current flowing through same, or by the heat radiated from the electrical resistance coil 26. The coiled bi-metallic thermostat 33 now winds itself up and rotates the cam 43 in the clockwise direction as viewed in FIGURES 3, 7 and 9. The cam follower roller 56 drops in position on the end 43c of the lobe, allowing the cam follower arm 57 to swing in the clockwise direction and allowing the switch lever 89 to swing in the clockwise direction and permitting the timing disc 65 to advance one step beyond the lower prong 64b of the escapement fork 64. The advance is limited to one step by the engagement of the upper prong 64a of the escapement with an aligned notch 66 in the timing disc. As the cam follower roller 56 continues to drop to its limit position, as shown in FIGURE 3, it allows the switch lever 89 to swing in the clockwise direction and lift the switch blade 93 to swing in the counter-clockwise direction, so as to close the movable contact 96 on the fixed contact 84 of the switch. This action starts a new cycle of operation.

Having now fully described my invention, what I claim as new and useful and desire to secure by Letters Patent of the United States is:

1. A combined timer and thermostat comprised by a housing means, a member rotatably carried by the housing means, a bi-metallic coil spring thermostatic element connected at one end to a portion of the housing means, surrounding the member, and connected at its other end to the member for rotating same alternately in opposite directions as the thermostatic element contracts or expands, a cam surrounding the member and fixed thereto for rotation therewith, a timing disc surrounding the member and free to rotate therearound, an escapement mechanism engageable with the timing disc, a follower arm mounted on the escapement mechanism and in rotating contact with the cam, and a switch having a movable member engaged by the follower arm to open and close the switch.

2. A combined timer and thermostat comprised by a housing means, a member rotatably carried by the housing means, a bi-metallic coil spring thermostatic element connected at one end to a portion of the housing means, surrounding the member, and connected at its other end to the member for rotating same alternately in opposite directions as the thermostatic element contracts or expands, a cam surrounding the member and fixed thereto for rotation therewith, a timing disc surrounding the member and free to rotate therearound, a coiled tension spring surrounding the member and having its ends connected between the timing disc and a fixed support for biasing the timing disc to rotation in one direction, an escapement mechanism carried by the housing means and engageable with the timing disc, a follower arm mounted on the escapement mechanism and in rotating contact with the cam, and a switch having a movable member engaged by the follower arm to open and close the switch.

3. A combined timer and thermostat comprised by a housing means, a member rotatably carried by the housing means, a bi-metallic coil spring thermostatic element connected at one end to a portion of the housing means, surrounding the member, and connected at its other end to the member for rotating same alternately in opposite directions as the thermostatic element contracts or expands, a cam surrounding the member and fixed thereto for rotation therearound, a knob slidably mounted on the member, clutch means operatively interconnecting the knob and the cam for selectively setting the cam in a desired position, a timing disc surrounding the member and free to rotate therearound, a coiled tension spring surrounding the member and having its ends connected between the timing disc and a fixed support for biasing the timing disc to rotation in one direction, an escapement mechanism carried by the housing means and engageable with the timing disc, a follower arm mounted on the escapement mechanism and in rotating contact with the cam, and a switch engaged by the cam follower arm to open and close the switch.

4. A combined timer and thermostat comprised by a housing means, a member rotatably carried by the housing means, a bi-metallic coil spring thermostatic element connected at one end to a portion of the housing means, surrounding the member, and connected at its other end to the member for rotating same alternately in opposite directions as the thermostatic element contracts or expands, a cam surrounding the member and fixed thereto for rotation therewith, a knob slidably mounted on the member, clutch means interconnecting the knob and the cam for selectively setting the cam in a desired position, said clutch means including splines secured to the knob, corresponding splines secured to the cam and spring means normally biasing said splines into engagement, a timing disc surrounding the member and free to rotate therearound, a coiled tension spring surrounding the member and having its ends connected between the timing disc and a fixed support for biasing the timing disc to rotation in one direction, an escapement mechanism carried by the housing means and engageable with the timing disc, a follower arm mounted on the escapement mechanism and in rotating contact with the cam, and a switch having a movable element engaged by the follower arm to open and close the switch.

5. A combined timer and thermostat comprised by a housing means, a shaft rotatably carried by the housing means, a bi-metallic coiled spring thermostatic element connected at one end to a portion of the housing means, surrounding the shaft, and connected at its other end to the shaft for rotating the same alternately in opposite directions as the thermostatic element contracts or expands, a cam surrounding the shaft and fixed thereto for rotation therewith, a sleeve surrounding said shaft and free to rotate therearound, a timing disc fixed to the sleeve for rotation therewith, an escapement mechanism carried by the housing means and engaged with the timing disc, a follower arm mounted on the escapement mechanism and in rotating contact with the cam and a switch having a movable member engaged by the follower arm to open and close the switch.

6. A combined timer and thermostat comprised by a housing means, a shaft rotatably carried by the housing means, a bi-metallic coiled spring thermostatic element connected at one end to a portion of the housing means, surrounding the shaft, and connected at its other end to the shaft for rotating the same alternately in opposite directions as the thermostatic element contracts or expands, a cam surrounding the shaft and fixed thereto for rotation therewith, a sleeve surrounding said shaft and free to rotate therearound, a timing disc secured to the sleeve for rotation therewith, a coiled tension spring surrounding the shaft and having its ends connected between the timing disc and a fixed support for biasing the timing disc to rotation in one direction, an escapement mechanism carried by the housing means and engageable with the timing disc, a follower arm mounted on the escapement mechanism and in rotating contact with the cam, and a switch having a movable member engaged by the follower arm to open and close the switch.

7. A combined timer and thermostat comprised by a housing means, a shaft rotatably carried by the housing means, a bimetallic coiled spring thermostatic element connected at one end to a portion of the housing means, surrounding the shaft, and connected at its other end to the shaft for rotating same alternately in opposite directions as the thermostatic element contracts or expands, a cam surrounding the shaft and fixed thereto for rotation therewith, a knob slidably mounted on the shaft, clutch means interconnecting the knob and the cam for selectively setting the cam in a desired position, a sleeve surrounding said shaft and free to rotate therearound, a timing disc fixed to said sleeve for rotation therewith, a coiled tension spring surrounding the shaft and having its ends connected between the timing disc and a fixed support for biasing the timing disc to rotation in one direction, an escapement mechanism carried by the housing means and engageable with the timing disc, a follower arm mounted on the escapement mechanism and in rotating contact with the cam, and a switch having a movable element engaged by the follower arm to open and close the switch.

8. A combined timer and thermostat comprised by a housing means, a shaft rotatably carried by the housing means, a bi-metallic coiled spring thermostatic element connected at one end to a portion of the housing means, surrounding the shaft, and connected at its other end to the shaft for rotating same alternately in opposite directions as the thermostatic element contracts or expands, a cam surrounding the shaft and fixed thereto for rotation therewith, a knob slidably mounted on the shaft, clutch means interconnecting the knob and the cam for selectively setting the cam in a desired position, a sleeve surrounding the shaft and free to rotate therearound, a timing disc secured to the sleeve for rotation therewith, a coiled tension spring surrounding the shaft and having its ends connected between the timing disc and a fixed support for biasing same to rotation in one direction, an escapement mechanism carried by the housing means and engageable with the timing disc, a follower arm mounted on the escapement mechanism and in rotating contact with the cam and a switch having a movable element engaged by the follower arm to open and close the switch.

9. A combined timer and thermostat comprised by a housing means, a shaft rotatably carried by the housing means, a bi-metallic coiled spring thermostatic element connected at one end to a portion of the housing means, surrounding the shaft, and connected at its other end to the shaft for rotating same alternately in opposite directions as the thermostatic element contracts or expands, a cam surrounding the shaft and fixed thereto for rotation therewith, a sleeve surrounding the shaft and free to rotate therearound, a timing disc fixed to said sleeve for rotation therewith, a lever pivotally carried intermediate its ends by the housing means, an escapement carried by one end of the lever and engageable with the timing disc, a cam follower arm resting at one end on said cam and secured at the other end to the other end of the lever for swinging movement, and a switch having a movable element engaged by the cam follower arm to open and close the switch.

10. A combined timer and thermostat comprised by a housing means, a shaft rotatably carried by the housing means, a bi-metallic coiled spring thermostatic element connected at one end to a portion of the housing means, surrounding the shaft, and connected at its other end to the shaft for rotating same alternately in opposite directions as the thermostatic element contracts or expands, a cam surrounding the shaft and fixed thereto for rotation therewith, a sleeve surrounding the shaft and free to rotate therearound, a timing disc fixed to the sleeve for rotation therewith, a lever pivotally carried intermediate its ends by the housing means, an escapement carried by one end of the lever and engageable with the timing disc, a cam follower arm resting at one end on said cam and secured at its other end to the other end of the lever for swinging movement, and a switch having an operating lever in engagement with the cam follower arm so as to be closed in one direction of movement and opened in the opposite direction of movement of the latter.

11. A combined timer and thermostat comprised by a housing means, a member rotatably carried by the housing means, a bi-metallic coiled spring thermostatic element connected at one end to a fixed support, surrounding the member, and connected at its other end to the member for rotating same alternately in opposite directions as the thermostatic element contracts or expands, a timing disc surrounding the member and mounted thereon for relative rotation thereto, a cam surrounding the member and mounted on the same for rotation therewith, an escapement mechanism carried by the housing means and engageable with the timing disc, a follower arm mounted on the escapement mechanism and in rotating contact with the cam, a switch having a movable element engaged by the follower arm to open and close the switch, a resistance coil mounted in juxtaposition to the coiled bi-metallic thermostat for radiating heat onto the latter, and a circuit for the resistance coil including a source of electrical power, a conductor from the source of electrical power to the resistance coil, a conductor from the resistance coil to the switch, and a conductor from the switch to the source of electrical power.

12. A combined timer and thermostat comprised by a housing means, a member rotatably carried by the housing means, a bi-metallic coiled spring thermostatic element connected at one end to a fixed support, surrounding the member, and connected at its other end to the member for rotating same alternately in opposite directions as the thermostatic element contracts or expands, a timing disc surrounding the member and mounted thereon for relative rotation thereto, a cam surrounding the member and mounted on said member for rotation therewith, an escapement mechanism carried by the housing means and engageable with the timing disc, a follower arm mounted on the escapement mechanism and in rotating contact with the cam, a switch having a movable element engaged by the follower arm to open and close the switch, a resistance coil mounted in juxtaposition to the coiled bi-metallic thermostatic element for radiating heat onto the later, and a circuit for the resistance coil including a source of electrical power, a conductor from the source of electrical power to the resistance coil, a conductor from the resistance coil to the bi-metallic thermostatic element, a conductor from the bi-metallic thermostatic element to the switch and a conductor from the switch to the source of electrical power.

13. A combined timer and thermostat comprised by a housing means, a shaft rotatably carried by the housing means, a bi-metallic coiled spring thermostatic element connected at one end to a portion of the housing means, surrounding the shaft, and connected at its other end to the shaft at one end of the latter for rotating the same in opposite directions as the thermostatic element contracts or expands, a sleeve surrounding said shaft and free to rotate therearound, a bushing carried by the housing means surrounding the sleeve and supporting the said sleeve and said shaft for independent rotation, a timing disc surrounding the shaft and secured to said sleeve for rotation therewith, a coiled tension spring surrounding the shaft and secured at one end to said bushing and at the other end to said timing disc for biasing the latter for rotation in one direction, a cam surrounding the shaft and secured to the same for rotation therewith, an escapement mechanism carried by the housing means and enengageable with said timing disc for limiting rotation of the latter to step-by-step movement, a follower arm mounted on the escapement mechanism and in rotating contact with the cam, a knob slidably mounted on the shaft, clutch means operatively interconnecting the knob and the cam for selectively setting the cam in a desired position, and a switch having a movable element engaged by said follower arm to open and close the switch.

References Cited by the Examiner
UNITED STATES PATENTS

| | | | |
|---|---|---|---|
| 2,172,820 | 9/39 | Kronmiller | 200—136 |
| 2,487,154 | 11/49 | Lloyd | 200—122 |
| 2,533,410 | 12/50 | Trad | 200—136 |
| 2,564,322 | 8/51 | Brosseau | 200—136 |
| 2,622,677 | 12/52 | Coffier et al. | 200—136 |

BERNARD A. GILHEANY, *Primary Examiner.*
ROBERT K. SCHAEFER, *Examiner.*